US007693071B2

(12) United States Patent
Achlioptas et al.

(10) Patent No.: US 7,693,071 B2
(45) Date of Patent: Apr. 6, 2010

(54) SYSTEM AND METHOD FOR ROUTING MESSAGES WITHIN A MESSAGING SYSTEM

(75) Inventors: Demetrios Achlioptas, Seattle, WA (US); Eric D. Tribble, Bellevue, WA (US); Malcolm E. Pearson, Kirkland, WA (US); Leon Warman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 994 days.

(21) Appl. No.: 11/139,704

(22) Filed: May 27, 2005

(65) Prior Publication Data

US 2006/0268722 A1    Nov. 30, 2006

(51) Int. Cl.
  *H04L 12/28* (2006.01)
(52) U.S. Cl. ..................................................... 370/238
(58) Field of Classification Search .................. 370/238
  See application file for complete search history.

(56) References Cited

U.S. PATENT DOCUMENTS

| | | | |
|---|---|---|---|
| 5,088,032 A | 2/1992 | Bosack | |
| 5,117,422 A | 5/1992 | Hauptschein et al. | |
| 5,283,856 A | 2/1994 | Gross et al. | |
| 5,471,467 A | 11/1995 | Johann | |
| 5,603,029 A | 2/1997 | Aman et al. | |
| 5,909,564 A * | 6/1999 | Alexander et al. | 710/316 |
| 5,999,932 A | 12/1999 | Paul | |
| 6,061,736 A | 5/2000 | Rochberger et al. | |
| 6,112,227 A | 8/2000 | Heiner | |
| 6,185,619 B1 | 2/2001 | Joffe et al. | |
| 6,249,807 B1 | 6/2001 | Shaw et al. | |
| 6,336,135 B1 | 1/2002 | Niblett et al. | |
| 6,393,464 B1 | 5/2002 | Dieterman | |
| 6,487,586 B2 | 11/2002 | Ogilvie et al. | |
| 6,650,626 B1 | 11/2003 | Cain | |
| 6,658,454 B1 | 12/2003 | Delany et al. | |
| 6,658,481 B1 | 12/2003 | Basso et al. | |
| 6,728,748 B1 | 4/2004 | Mangipudi et al. | |
| 6,757,763 B1 * | 6/2004 | Preiss et al. | 710/105 |

(Continued)

FOREIGN PATENT DOCUMENTS

JP    2001326691    11/2001

(Continued)

OTHER PUBLICATIONS

Leon-Garcia, Alberto and Widjaja, Indra, Communication Networks, 2003, McGraw-Hill Science Engineering, 2nd Edition, pp. 514-515, 523-528.*

(Continued)

*Primary Examiner*—Derrick W Ferris
*Assistant Examiner*—Omar Ghowrwal
(74) *Attorney, Agent, or Firm*—Senniger Powers LLP (57) ABSTRACT

Systems and methods are described which provide enhanced stability, increased predictability, reduced transmission costs, and which conserve bandwidth in routing messages over computer networks. The systems and methods further include providing improved transmission of messages wherein the messages are transmitted to nodes closest to a target delivery node. If delivery is possible to a target node, the message transmission stops at the point of failure in the network, wherein delivery to the target node is accomplished at a later time or the message is returned to the sender.

13 Claims, 4 Drawing Sheets

U.S. PATENT DOCUMENTS

| | | | |
|---|---|---|---|
| 6,779,021 | B1 | 8/2004 | Bates et al. |
| 6,792,472 | B1 | 9/2004 | Otterness et al. |
| 6,831,895 | B1 | 12/2004 | Ji et al. |
| 6,842,772 | B1 | 1/2005 | Delaney et al. |
| 6,847,989 | B1 | 1/2005 | Chastain et al. |
| 6,868,436 | B1 | 3/2005 | Fleming, III |
| 7,127,741 | B2 | 10/2006 | Bandini et al. |
| 7,133,660 | B2 | 11/2006 | Irlam et al. |
| 7,133,898 | B1 | 11/2006 | Malik |
| 7,356,578 | B1 * | 4/2008 | Eatough ............... 709/223 |
| 2001/0032245 | A1 | 10/2001 | Fodor |
| 2002/0004826 | A1 | 1/2002 | Waite et al. |
| 2002/0065922 | A1 | 5/2002 | Shastri |
| 2002/0097687 | A1 * | 7/2002 | Meiri et al. ............ 370/254 |
| 2002/0162047 | A1 | 10/2002 | Peters et al. |
| 2003/0154254 | A1 | 8/2003 | Awasthi |
| 2003/0177194 | A1 | 9/2003 | Crocker et al. |
| 2003/0182410 | A1 | 9/2003 | Balan et al. |
| 2003/0229672 | A1 | 12/2003 | Kohn |
| 2004/0133528 | A1 | 7/2004 | Furka |
| 2004/0157598 | A1 * | 8/2004 | Parkman ............... 455/427 |
| 2004/0167965 | A1 | 8/2004 | Addante et al. |
| 2004/0168155 | A1 | 8/2004 | O'Farrell |
| 2005/0021644 | A1 | 1/2005 | Hancock |
| 2005/0081059 | A1 | 4/2005 | Bandini et al. |
| 2005/0177820 | A1 | 8/2005 | Mei et al. |
| 2005/0256931 | A1 | 11/2005 | Follmeg et al. |
| 2005/0262205 | A1 | 11/2005 | Nikolov et al. |
| 2005/0281191 | A1 * | 12/2005 | McGee et al. ............ 370/216 |
| 2006/0218235 | A1 | 9/2006 | De Cnodder |
| 2006/0225032 | A1 | 10/2006 | Klerk et al. |
| 2006/0236304 | A1 | 10/2006 | Luo et al. |
| 2006/0253597 | A1 | 11/2006 | Mujica |
| 2008/0137580 | A1 * | 6/2008 | Axelsson et al. ............ 370/315 |

FOREIGN PATENT DOCUMENTS

| | | |
|---|---|---|
| KR | 20010092554 | 10/2001 |
| KR | 20040079667 | 9/2004 |
| KR | 2004091656 | 10/2004 |

OTHER PUBLICATIONS

OSPF Routing Algorithm (http://www.juniper.net/techpubs/software/junos/junos70/swconfig70- routing/html/ospf-overview6.html).

Next Generation Routing Mechanism (http://freenet.sourceforge.net/index.php?page=ngrouting).

Androutsopoulos, I., et al., "An Evaluation of Naive Bayesian Anti-Spam Filtering," http://arxiv.org/PS_cache/cs/pdf/0006/0006013.pdf, 11th European Conference on Machine Learning, Barcelona, Spain, 2000, pp. 9-17.

Ioannidis, J., "Fighting Spam by Encapsulating Policy in Email Addresses," 2003 Network and Distributed System Security Symposium, AT&T Labs—Research, http://www.tla.org/papers/spa-ndss03.pdf, 8 pages.

Kangasharju, J., et al., "Secure and Resilient Peer-to-Peer E-Mail: Design and Implementation," 8 pages, http://cis.poly.edu/~ross/papers/email-p2pconf-final.pdf.

Cormack, G., et al., "A Study of Supervised Spam Detection Applied to Eight Months of Personal E-Mail," http://plg.uwaterloo.ca/~gvcormac/spamcormack1.pdf, Jul. 1, 2004, pp. 1-31.

Sun Microsystems, Chapter 5 Deployment Design, Online, Feb. 2005, Retrieved Jul. 2009, http:// web.archive.org/web20050219003745/http://docs.sun.com/source/819-0058/dep_archetect.html, pp. 1-22.

* cited by examiner

SYSTEM AND METHOD FOR ROUTING MESSAGES WITHIN A MESSAGING SYSTEM

TECHNICAL FIELD

Embodiments of the present invention relate to the field of routing messages over a network to one or more recipients. In particular, embodiments of this invention relate to systems and methods for reliably routing electronic mail over a network at minimal transfer costs; specifically when a single system to system transfer can pass responsibility for multiple recipients; more specifically in a system involving store-and-forward transfer of responsibility. Embodiments of the present invention also beneficially provide for systems and methods for reducing the costs in terms of minimizing network traffic of transferring mail addressed to multiple recipients that reside on different nodes while minimizing the amount of administrative network traffic; while preventing infinite loops due to inconsistent views of the network.

BACKGROUND OF THE INVENTION

Some prior systems and methods provide for routing mail over networks based upon network costs agreed upon by the different nodes that make up the network. However, these systems lack stability when the transfer costs vary or fluctuate, as the nodes must agree upon the transfer costs prior to the mail being transferred. These systems also pay an excessively high cost in terms of complexity or network traffic to resolve differences in the node's views of network topology. Thus, mail may be unnecessarily delayed until the costs are agreed upon.

Other systems and methods provide for routing to multiple mail recipients that calculate a routing path based upon shortest individual paths to the recipients. These methods, however, can unnecessarily use bandwidth by sending the same mail file over multiple links to multiple recipients.

Systems that rely on agreeing at the application level about network topology are unpredictable for administrators. The present system makes the system easier to diagnose because its behavior is predictable over a wider range of network conditions. The system and method of the present invention ensure that if a message cannot reach its final destination, it will get as close as possible to the intended destination.

Accordingly, a system and method for reliably routing mail over a network to one or more recipients is desired to address one or more of these and other disadvantages.

SUMMARY OF THE INVENTION

The present invention overcomes the deficiencies of the known art by providing a system and method for routing a message over a network without requiring absolute agreement of transmission costs between a sending and a receiving node wherein the message is relayed to an available node that is the closest to the receiving node in terms of transmission costs. The system and method also optimize network bandwidth when routing a message over a network to multiple recipients residing on different nodes by delaying the forking of the message until the last node of divergence that is common to the network route to the recipients to the extent that the same view of topology is held by these nodes. The system and method also provide for improved reliability by routing mail to the closest node to the recipient's node based on availability schedules of the nodes. Additionally, the system and method of the present invention optimize the speed of routing a message to a recipient by determining the available node or nodes to which the message should be transmitted, and if a node is unavailable, selecting the next best node to which the message should be transmitted.

In accordance with the present invention, one aspect provides a computer-implemented method for transmitting a message over a computer network having a current node, a target node, and one or more intermediate nodes connected to the network between the current node and the target node. The method comprises creating a destination alternative table of the intermediate nodes located on the network having transmission costs to the target node that are less than the transmission costs of the current node to the target node, wherein the intermediate nodes are prioritized according to their minimum transmission costs. Transmission of the message is attempted to the target node. If the transmission of the message to the target node fails, transmission of the message is attempted to at least one intermediate node as a function of its priority identified in the destination alternative table.

Another aspect of the present invention includes a message communication system for transmitting a message between the current server and the target server on a message communication network. The system comprises a current server, a target server, and one or more intermediate servers connected to the network. The system also includes a destination alternative table of the intermediate servers located on the network having transmission costs to the target server, wherein the intermediate servers are prioritized according to their minimum transmission costs. The current server being configured to execute computer-executable instructions for attempting transmission of the message to the target server. If the transmission of the message to the target server fails, the current server attempts transmission of the message to at least one intermediate server as a function of its priority identified in the destination alternative table.

Another aspect of the present invention includes one or more computer-readable media having computer-executable instructions for transmitting a message over a computer network. The network comprising a current node, a target node, and one or more intermediate nodes connected to the network between the current node and the target node. The computer-executable instructions comprise instructions for determining the transmission costs from the intermediate nodes to the target node and prioritizing the intermediate nodes according to their associated transmission costs. The instructions also comprise instructions for attempting transmission of the message to the target node; if the transmission of the message to the target node fails, attempting transmission of the message to at least one intermediate node as a function of its priority identified in the destination alternative table.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
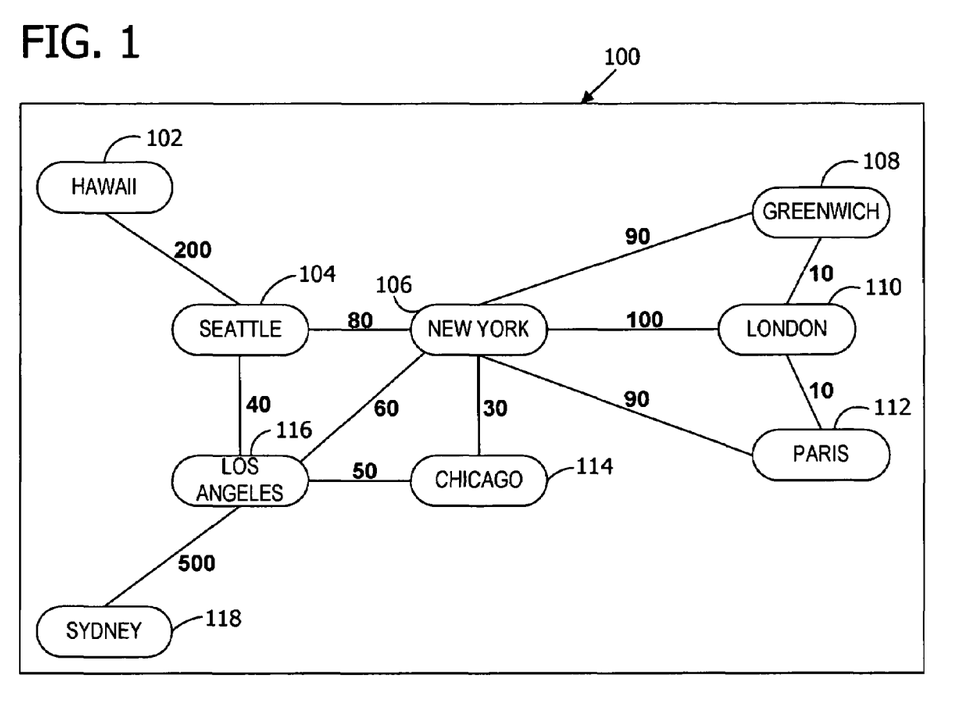
FIG. 1 is an exemplary illustration of a network of nodes and links between the nodes in a message routing network.

Referring first to FIG. 1, an exemplary illustration is provided of a network of nodes and links between the nodes in a message routing network in which the present invention may be implemented. A computer network 100 comprises a number of nodes or message transfer agents (MTAs) that can send and receive messages, such as electronic message, electronic mail, a packet, and the like, over links that connect the nodes. Each node may contain recipients that receive the message or mail that is routed through the network from a sending node to the target node where the recipient is located. The bold numbers adjacent to the lines that connect the various nodes of network 100 represent hypothetical transmission costs associated with transmitting a message across the links. In this example, the transmission costs associated with sending a message from node 102 (Hawaii) to node 104 (Seattle) would be 200. Costs can also be considered as being inversely proportional to network availability and thus can be viewed as the opportunity cost of using a link. In this example, fixed costs are used for purposes of illustration, but in more advanced implementations, actual costs are updated dynamically as the bandwidth is allocated/consumed.

As an illustration of routing of a message over a network, a sender of a message located on node 102 (Hawaii) sends mail addressed to a first recipient on node 108 in Greenwich, UK and a second recipient on node 112 in Paris, France. If the message were to be individually sent as two separate messages from Hawaii to Greenwich and from Hawaii to Paris, the total transmission costs for sending the files to the two recipients would be 740 (e.g., 200+80+90 (Hawaii to Greenwich) and 200+80+90 (Hawaii to Paris). However, if the message is sent as a single file through the node links that are common to both routes on the path to the different recipients, transmission costs would be reduced and network bandwidth would be conserved. Thus, if the message was sent as a single file transmission along the common pathway from node 102 (Hawaii) to node 104 (Seattle) and also from node 104 (Seattle) to node 106 (New York), and then bifurcated into two messages at node 106 (New York) that are sent to node 108 (Greenwich) and node 112 (Paris), the total cost for transmitting the mail would be 460 (e.g., 200+80 (Hawaii to New York) and 90+90 (New York to Greenwich and New York to Paris). Network bandwidth is preserved by avoiding application level transfers to intervening nodes when these nodes are not a point of divergence and when there is not a network failure. For example, the message is transmitted directly from Hawaii to New York. However, if Hawaii is unable to reach NY, an attempt is made to transmit the message from Hawaii to Seattle.

When a message is bifurcated at a node, the node is responsible for transmitting the message to the subsequent node along the pathway to the target node. Thus, for example, if the message is to be split at a node and sent to three different nodes, the current node maintains the responsibility for continuing the transmission of the message. Once the receiving node accepts the message, it assumes responsibility for transmitting the message to the next node along the pathway to the target node, and so forth, until the message is accepted by the target node.

In one embodiment of the system and method of the present invention, the routing of a message over a network is optimized by delaying the forking of the message until the last common node of the two recipients. This embodiment beneficially reduces transmission costs, conserves available network bandwidth, and also improves reliability and speed of the recipients receiving the message by relaying the message to a common node of divergence that is closest, in terms of transmission cost, to the target nodes of the recipients. Using the illustration described above, the system and method of the present invention would delay the forking of the message at node 106 (New York) and instead forward the file to the last common node of divergence of the two recipients, which, according to FIG. 1, is node 110 (London). At node 110 (London) the message is finally forked and transmitted to node 108 (Greenwich) and node 112 (Paris). Thus, the transmission costs for transmitting the message to the two recipients would be 400 (e.g., 200+80+100 (Hawaii to London) and 10+10 (London to Greenwich and London to Paris)).

As used herein, descriptions of proximity or distance to a node refer to transmission costs required to send a message from one node to a target node. Thus, a node that is "closest" to a target node would be the node that has the lowest transmission cost or other abstract cost, such as the opportunity cost outlined above, to send a file to the target node.

Transmitting a message across a network to a node that is the closest to the recipient is significant when a failure occurs on a network that can delay the message from being transmitted. By transmitting messages as close to the recipient as possible, progress of moving toward the target node is made in the event of a network failure. In such an event, the message can be quickly transmitted to the recipient when the network becomes available. This also handles the case where not all links are available at the same time. For example, an end-to-end connection from an initiating node to a target node may never actually be available. However, in utilizing the method and system of the present invention, progress can still be made and the message will eventually get through. Furthermore, network nodes often have better or more reliable cost and routing information regarding nodes that are closer in proximity to them than do remote nodes. Thus, if a failure were to occur near the target node of a recipient, a node that is in close proximity may be able to either identify an alternative path to the recipient that is both cost efficient and ensures that the message is received by the recipient rather than being returned to the sender as non-deliverable.

Several methods can be used to determine which node a message should be transmitted to in the event that the file can not be transmitted directly to the target node.

In one embodiment, a linear path of nodes is identified that begins with the current node, ends with the target node, and contains one or more intermediate nodes connected to the network that are between the current node and the target node. If the target node is unavailable, the file is attempted to be transmitted to the intermediate node that is closest to the target node. If that node is unavailable, an attempt is made to transmit the message to the intermediate node that is second closest to the target node, and so forth, until there are no other intermediate nodes left that have not been tried or until a threshold of a predetermined number of attempts has been met. In such an event, the message may be delayed for later resending or returned to the sender as undeliverable.

In another embodiment, nodes are identified that are within a specified transmission cost range to the target node. The nodes are then organized in priority order of their transmission costs with the lowest transmission cost having the highest priority. Thus, if a transmission attempt to the target node fails, the next attempt is to the highest priority node, i.e., the node with the lowest transmission costs. If that transmission attempt fails, a third attempt is made to the next highest priority node (i.e., the node having the second-lowest transmission costs). This process is repeated until there are no other nodes left that fall within the specified cost range, or until a threshold of a predetermined number of attempts has been met. As described above, in such an event, the message may be delayed for later resending or returned to the sender as undeliverable. In another embodiment, a second minimal transmission cost range is identified that forms a concentric circle around the first cost range. Transmission attempts are made to nodes in the second range similar to described above for the minimum cost range. Further embodiments can include additional concentric circles of transmission cost ranges.

In another embodiment, a "halving retreat" process is followed wherein a linear line of intermediate nodes is identified between the current node and the target node. If a transmission attempt to the target node fails, an attempt is made to transmit the message to an intermediate node, for example, "Node D." If the attempted transmission to Node D fails, an attempt is made to transmit the message to the intermediate node that is located half-way between the current node and Node D. This process is continued until there are no other nodes left, or until a threshold of a predetermined number of attempts has been met. As described above, in such an event, the message may be delayed for later resending or returned to the sender as undeliverable.

In another embodiment, an accelerated retreat process may be utilized in identifying potential alternative nodes to transmit messages to. If the target node is unavailable, the accelerated retreat process may identify the node that is, for example, four nodes from the target node. If attempts to send a file to that node fail, an attempt to send the file to the node that is, for example, twelve nodes away, and so forth until there are no other nodes left, or until a threshold of a predetermined number of attempts has been met. As described above, in such an event, the message may be delayed for later resending or returned to the sender as undeliverable.

In still another embodiment, an attempt is made to send a message as close to the target node as possible based upon the operating schedules of the individual nodes. This method may be combined with any of the patterns identified above related to a retreat strategy for transmitting a message if the message cannot be transmitted directly to a target node. For example, the path between the current node and the target node consists of intermediate nodes A, B, and C, wherein A is the furthest from the target node and node C is the closest to the target node. If it is currently 3:30 p.m. and node A accepts files from 1:00 p.m. to 4:00 p.m., node B accepts files from 3:00 p.m. to 6:00 p.m., and node C accepts files from 6:00 p.m. to 10 p.m., an attempt will be first made to transmit the message to node B which is the closest available node to the target node based upon operating schedules.

Another aspect of the present invention is its stability to route a message regardless of fluctuating/globally weakly consistent/inconsistent transmission costs that may be identified by different nodes of the network. Transmission costs of routing a message between network nodes are often provided by third parties to operators of the nodes or MTAs. Often, however, two nodes may not be provided with identical transmission cost information, especially at a single point in time. Thus, a recipient node may determine that a different path to a target node is shorter, i.e., costs less, than the path determined by the sending node. For example, sending node A determines that the lowest transmission cost pathway to target node D is to transmit the message from A to B to C and finally to D. Since transmission costs are sometimes in disagreement, node C may have cost information that the shortest path to D is to first send it back to B. Thus, a problem of cycling can occur when the message is looped back and forth between node B and node C.

Instead of delaying transmitting a message until the nodes agree upon transmission costs, the present invention monitors or tracks the number of nodes through which a file passes on its path to the target node. For example, in an email document, the nodes the file passes through on its path from the sender node to the target node are added to the SMTP header, or other mechanism for other systems. For example, X.400 utilizes the idea of an Envelope for this purpose. Thus, if the number of nodes through which a file passes on its path to a target node exceeds a minimum threshold, the node halts further transmittance for a period of time (a settling period) to permit the transmittance costs to settle across the network. After the settling period has passed, the message is attempted to be transmitted to the target node according to the shortest path (least transmission cost) and the number of nodes through which a file passes is continued to be monitored. If transmission costs have settled after the period of time has lapsed, the file is successfully sent to the target node where it is received by the addressee. However, if the transmission costs are still unsettled and cycling of the file continues, the cycling of the file is terminated when the number of nodes through which a file passes on its path to a target node meets a maximum threshold. If the maximum threshold is reached, the file is marked as not deliverable and/or a non-delivery report is appended to the file and it is returned to the sender.

In one embodiment, the minimum threshold is 10 or more nodes. In another embodiment, the minimum threshold is 10 to 15 nodes.

In one embodiment the settling period is up to one hour. In another embodiment, the settling period is up to 30 minutes. In still another embodiment, the settling period is up to 15 minutes.

In one embodiment, the maximum threshold is 20 or more nodes. In another embodiment, the maximum threshold is 25 to 35 nodes.

In one embodiment, the computer network of the present invention comprises nodes connected to the internet. In another embodiment, the computer network of the present invention is a corporate or university network crossing multiple countries. In another embodiment, the computer network of the present invention is a corporate or university network crossing multiple states. In another embodiment, the computer network of the present invention is a corporate or university network crossing multiple cities. In still another embodiment, the computer network of the present invention is a corporate or university network crossing multiple buildings of a single city or corporate or university campus.

By monitoring or tracking the number of nodes through which a file passes instead of delaying the sending of the message until costs are completely settled results in a more stable routing system and method that transmit messages to recipients, without delay, in the event minor transmittance cost disparities are present across the network. The system and method of the present invention therefore do not delay transmitting messages until all nodes agree on costs, but rather transmit the files to nodes that are closer to the target node. As previously discussed, nodes have better transmission cost and network status information for nodes that are in close proximity than more remote nodes. Thus, by transmitting messages to nodes that are closer to the target node, the files are not delayed, and the nodes that are closer to the target node are more likely to have more accurate cost and network status information that enable it to successfully transmit the file to the target node.

Figure 2A:
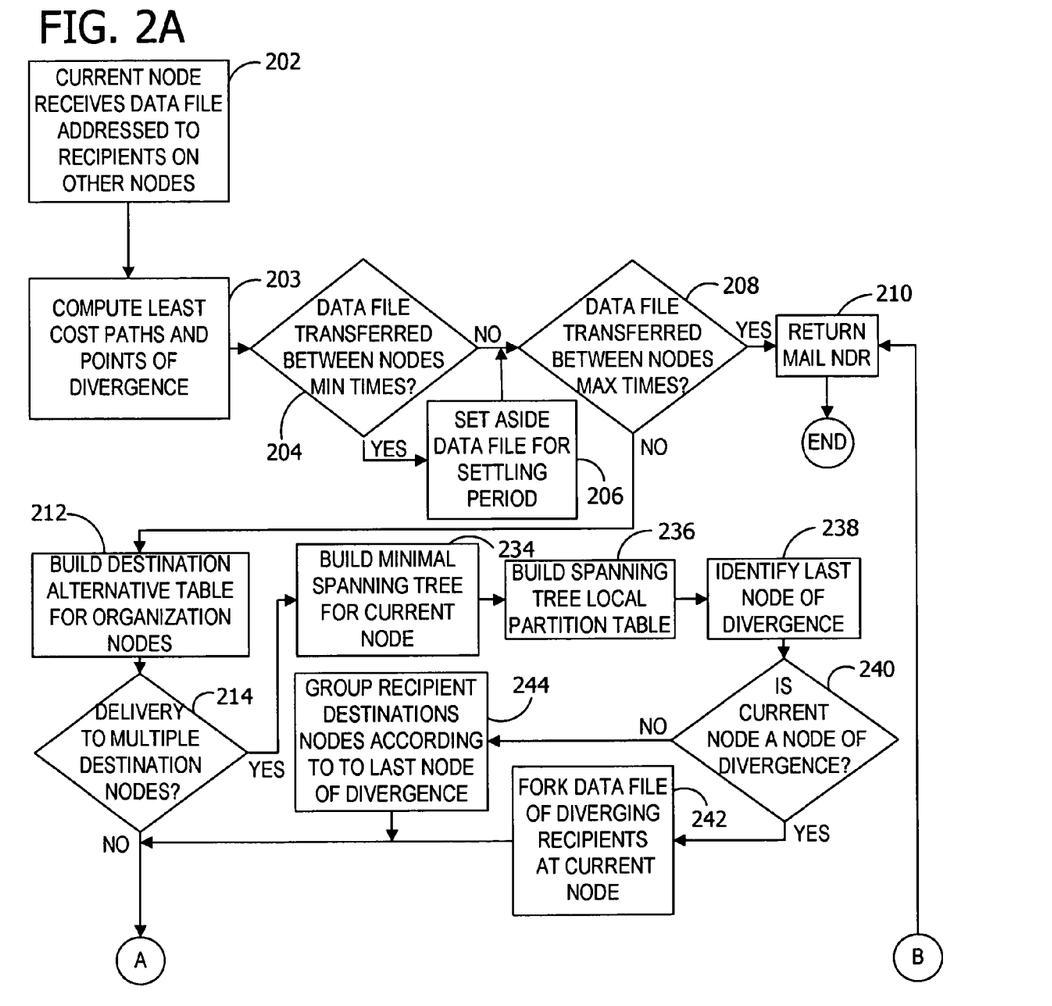
FIG. 2 is a flowchart illustrating an exemplary process of one embodiment of the present invention wherein a message being conveyed over a network is transmitted to one or more recipients.
Figure 2B:
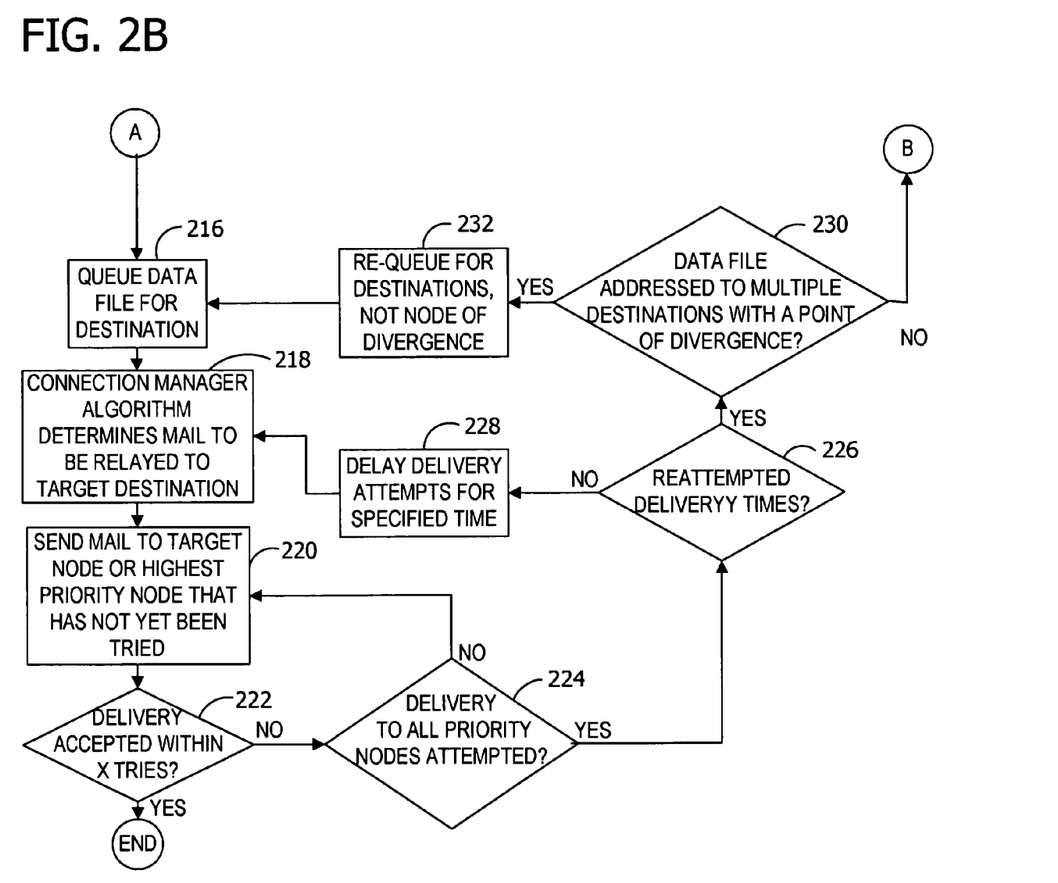

Referring next to FIG. 2, a flowchart illustrating an exemplary process of one embodiment of the present invention is provided wherein a message being conveyed over a network is transmitted to either one or more recipients. The flowchart describes the process carried out by a node (hereinafter referred to as the "current node"). At 202, the current node receives a message that is to be sent to one or more recipients residing at one or more target nodes other than the current node. The current node is either the original node to send a message or it is an intermediate node connected to the network between the originally sending node and the target node.

At 203, least cost paths and points of divergence of nodes on the network are computed. These methods are known in the art and are not limited to any particular computation. Ongoing monitoring of changes in system configuration is conducted and the least cost paths and points of divergence are recomputed as the system configuration changes.

At 204, a determination is made whether the message has been transferred to MIN number of nodes, wherein MIN is a predetermined minimum threshold number. If the number of nodes the file has been transmitted to exceeds the minimum threshold number, the file is set aside at 206 for a predetermined Settling Period to permit the transmission costs to settle.

At 208, a determination is made whether the message has been transferred to MAX number of nodes, wherein MAX is a predetermined maximum threshold number. If the number of nodes the file has been transmitted to equals the maximum threshold number, the file is returned to the sending party and marked as non-deliverable at 210. In one embodiment, a non-delivery report is provided to the sender that further describes the delivery failure for the file.

At 212, the current node builds a Destination Table that identifies the transmission costs associated with sending message to the nodes that are present in the network. The Destination Alternative Table further prioritizes the nodes on the network according to the minimum transmission costs associated with transmitting messages to them from the current node. A determination is made at 214 whether the message is to be sent to one or more recipients residing on a single node, or whether the file is to be sent to two or more recipients residing on two or more different nodes.

If it is determined that the message is to be sent to one or more recipients residing on a single node, the message is added to the queue at 216 for transmission to a destination node.

A connection manager algorithm determines that the mail should be sent to a destination node at 218. The connection manager algorithm first attempts to transmit the message directly to the target node that is identified on the message at 220. If the file cannot be directly sent to the target node, either because there is not a direct connection, or because the target node cannot accept the file for some reason (e.g., component failure, bandwidth limitations, network failure, configuration errors, lower level system policy and the like), the file is transmitted to the highest priority node identified in the Destination Alternative Table that has not yet been tried by the current node. At 222, the current node determines if the file is successfully transmitted to the destination node within X tries, wherein X is a predetermined number for transmission attempts by the current node. Alternatively, or in addition to a predetermined number of transmission attempts, X may include a predetermined time limit within which the message must be sent. If the file is successfully transmitted to the destination node, the current node's responsibilities have been fulfilled and the process ends.

If the current node determines at 222 that the file was not successfully transmitted to the destination node within X tries (or a time limit for X has been exceeded), the current node determines if attempts have been made to transmit the mail to all the destination nodes identified in the Destinations Alternative Table at 224. If transmissions have not been attempted to all of the identified destination nodes, the current node attempts to send the message to the highest priority node at 220 that has not yet been attempted. If delivery has been attempted to all of the identified destinations nodes, the current node determines if delivery to all nodes has been attempted Y times at 226, wherein Y is a predetermined number of transmission attempts that are made by the current node. Alternatively, or in addition to a predetermined number of transmission attempts, the Y may include a predetermined time limit within which the message must be sent. If the current node has not attempted delivery Y times (or a time limit for Y has been exceeded), the message is set aside for a specified time period at 228 to permit the network to be repaired. After the specified time period has elapsed, the connection manager again determines that the mail should be sent to a destination node at 218.

If the current node has attempted delivery Y times or a predetermined time limit within which the current node must deliver the message has been exceeded, the current node determines whether the message is addressed to multiple destinations with a common node of divergence at 230. If so, the file is requeued for the individual destinations rather than the node of divergence at 232 and added to the queue at 216.

If the current node determines at 230 that the message is addressed to one or more recipients residing at a single target node, the file is returned to the sending party and marked as non-deliverable at 210. In one embodiment, a non-delivery report is provided to the sender that further describes the delivery failure for the file.

If the current node determines at 214 that the message is addressed to multiple recipients residing at two or more different nodes, a Minimal Spanning Tree is created at 234 wherein the current node is the root. In one embodiment, the Minimal Spanning Tree is computed in advance and used for transmitting multiple different messages. A Spanning Tree Local Partition Table is created at 236. It is a Minimal Spanning Tree which encodes the minimize cost spanning tree for the network. The Minimal Spanning Tree is used to find the points of divergence. Utilizing the Minimal Spanning Tee and the Spanning Tree Local Partition Table, the current node identifies the last node of divergence for the recipients at 238. If at 240 it is determined that the current node is the last node of divergence for the recipients, at 242 the message is forked to the target nodes of the recipients and the message is placed on the queue at 216.

If the current node is not a node of divergence, the current node groups the recipient destination nodes at 244 according to the last node of divergence for each group and places the grouped destinations on the queue at 216.

In one embodiment of the present invention, as described in FIG. 2, the last node of divergence may not be available or cannot accept messages that are attempted to be sent to it. In such a case, the present invention forks the message at the current node in order to ensure that the message is successfully transmitted to the recipient at the expense of additional transmission costs and bandwidth. Thus, while the first attempt(s) is to transmit a message in a manner that delays forking a file until the last node of divergence, if delaying forking would either cause the file to be delayed in delivery or undeliverable, the present system and method instead fork the message earlier, thereby transmitting the file to the recipient. Thus, the file is forked earlier as it is typically believed that it would be more valuable for the recipient to receive the message than to save the additional transmission costs and bandwidth associated with the file and forking the file at the last node of divergence. An example of this is illustrated in FIG. 1 where the current node is node 106 (New York) which is attempting to forward the message to node 110 (London) which is the last node of divergence to recipients residing at node 108 (Greenwich) and node 112 (Paris). If node 106 (New York) cannot forward the message to node 110 (London), it forks the message recipients at 230 and places two messages on the queue wherein one message is transmitted to node 108 (Greenwich) and the other message is transmitted to node 112 (Paris). Thus, the transmission costs increase from 120 to 180, but instead of delaying the message or returning the file to the sender as non-deliverable, the file is sent directly to the recipients nodes of node 108 (Greenwich) and node 112 (Paris).

In another embodiment, the system and method maintain a cache of all recently failed connections. In another embodiment, the system and method maintain a cache of all recently failed connections grouped by the adjacent node that they are reached through. These embodiments can be utilized to avoid attempting to transmit message to recently failed nodes and thereby avoid delaying the transmittance of a file. In one embodiment, a cache is maintained for failed connections occurring within a predetermined time period. In one embodiment, the time period is the most recent six hours. In another embodiment, a cache is maintained for failed connections occurring within the most recent hour. In another embodiment, a cache is maintained for failed connections occurring within the most recent thirty minutes.

In one embodiment, attempts are made to simultaneously transmit messages to multiple alternative nodes instead of opening connections to alternatives one at a time. In this embodiment, the node that is closest to the ultimate target and succeeds within a predetermined time, e.g., one second, is selected. If none succeed in the predetermined time period, the node that first successfully accepts the message is used. If none succeed, then a longer time period can be used.

In one embodiment, if the current connection is "slow," i.e., the bytes/second is significantly lower than average, then an attempt to open a connection to a "closer" node is made to transmit a second message. If the "closer" node is at or above "average," sending the message to the "slow" node should be discontinued in favor of the "closer" node.

Figure 3:
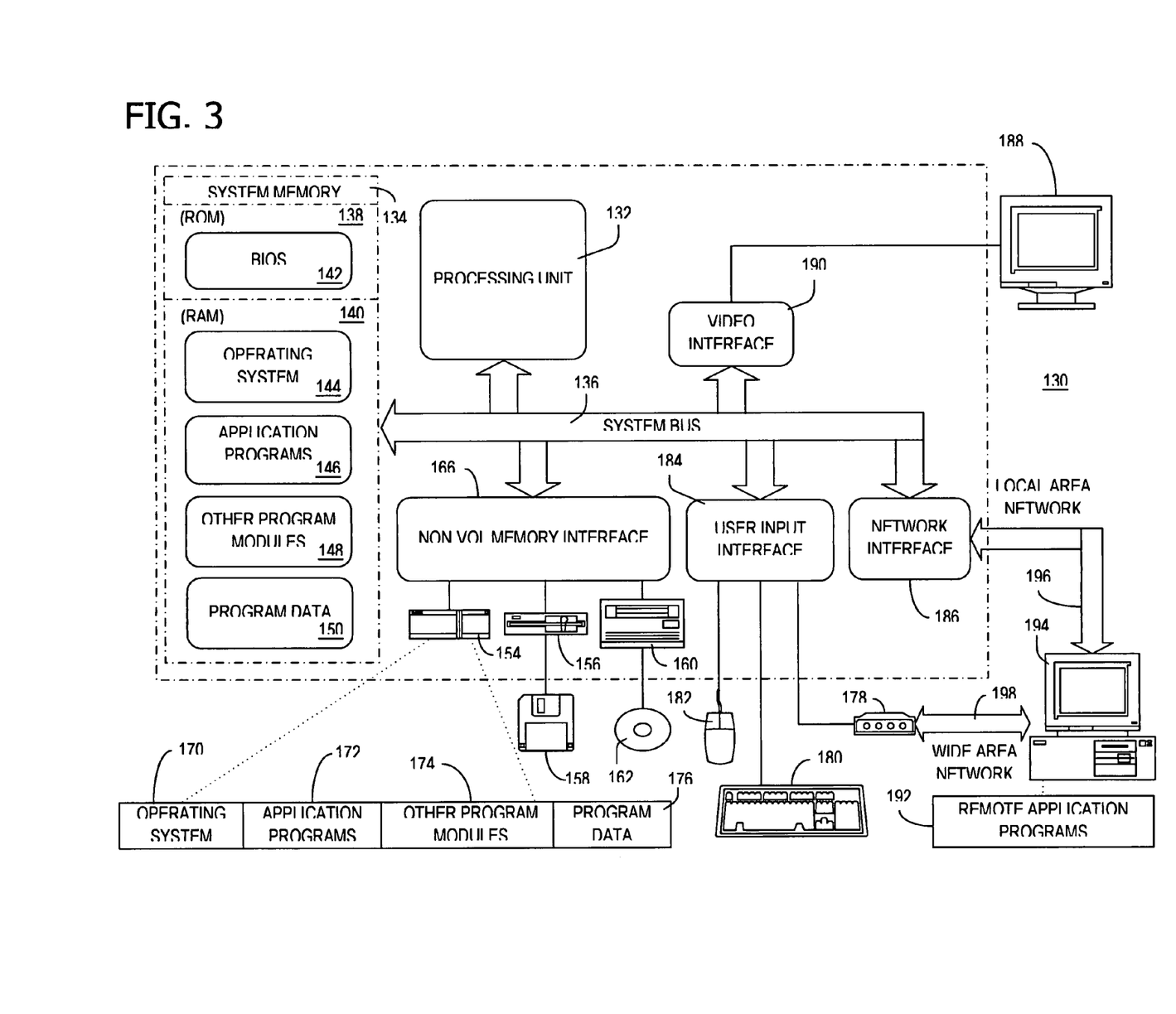
FIG. 3 is a block diagram illustrating one example of a suitable computing system environment in which the invention may be implemented.

FIG. 3 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, message structures, program modules or other message. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, message structures, program modules, or other message in a modulated message signal such as a carrier wave or other transport mechanism and include any information delivery media. Those skilled in the art are familiar with the modulated message signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains message and/or program modules that are immediately accessible to and/or presently being operated on by processing unit 132. By way of example, and not limitation, FIG. 3 illustrates operating system 144, application programs 146, other program modules 148, and program message 150.

The computer 130 may also include other removable/non-removable, volatile/nonvolatile computer storage media. For example, FIG. 3 illustrates a hard disk drive 154 that reads from or writes to non-removable, nonvolatile magnetic media. FIG. 3 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 3, provide storage of computer readable instructions, message structures, program modules and other message for the computer 130. In FIG. 3, for example, hard disk drive 154 is illustrated as storing operating system 170, application programs 172, other program modules 174, and program message 176. Note that these components may either be the same as or different from operating system 144, application programs 146, other program modules 148, and program message 150. Operating system 170, application programs 172, other program modules 174, and program message 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 3 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 3 illustrates remote application programs 192 as residing on the memory device. The network connections shown are exemplary and other means of establishing a communications link between the computers may be used.

Generally, the message processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other message processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the message processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and message structures that perform particular tasks or implement particular abstract message types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metamessage interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The following examples further illustrate the invention.

Example

Routing of Electronic Mail Over a Network

Initialization

During initialization, there are two message structures to be computed. These are used throughout the execution of the process. If the underlying message changes, these message structures can simply be recomputed and used from that point forward.

Destination Alternative Table

For every node within the organization, delivery nodes that are closer to the current machine are determined and placed on a list or table (the destination alternative table). The list is ordered according to their minimal transmittal cost to the target in question. This includes all the nodes on the minimal cost path between the current node and the target node. This can also include other nodes, on other paths from the source to the target as long as their minimal cost to the target is less than the transmittal cost from the current node to the destination node. Finally, this can include nodes that are on a path to the target, but not on a path from the current node to the target. Here, distances are according to the link costs defined between nodes, accounting for link bridges.

It is a heuristic decision of how inclusive the algorithm is to be. Including a larger set will allow the system to try as many alternative steps as possible to reach the target; whereby increasing the chance of success, but reducing the overall efficiency in the face of link failures. Being more inclusive allows us to account for the likelihood that the underlying node link records are just a model of the underlying topology and do not represent every aspect of the physical network topology.

Minimal Spanning Tree

A minimal spanning tree is computed for the network nodes/links with the current node as the root. Additionally, a spanning tree local partition table is built. For each destination D, the next hop is determined (first adjacent node N in the path in the minimal spanning tree from the current node to the target D).

Handling Inconsistent Global Message

The algorithm assumes that network node/link message is globally consistent. In practice, this will frequently be true because the message is replicated aggressively and because it changes slowly, only under operator control. However, it is not guaranteed to be true due to replication latency.

The system will track the number of times a message has been transferred from node to node, using, for example, the SMTP Received: header. If the transfer count exceeds a first threshold, the mail will be delayed, giving replication a chance to settle. If the transfer count exceeds a maximum threshold, the system is presumed to be broken and the mail is returned to the sender with information about the failed delivery, such as a non-delivery report (NDR).

A benefit of the present algorithm is its need for minimal information about nodes that are further away from it. As a result, it is less sensitive to the inconsistencies in the global node/link message.

Single Destination Case

In the Single Destination Case, mail is routed to the address of an individual recipient. There are no concerns about fan-out issues of recipients at multiple nodes because there is only one recipient. This may have occurred because the mail was originally addressed to an individual recipient, or may have occurred because the mail was originally addressed to multiple recipients, and the mail has fanned out.

At the time of routing, the message is placed on a queue for delivery to the destination node.

At the time of relay (when the system wishes to move mail from the local machine to a remote machine), a connection manager algorithm determines that the mail should be relayed to destination T.

The mail is first attempted to be transmitted to the destination of the node of the recipient. If the transmission to the destination node fails, additional attempts are made to transmit the mail as a function of the minimal transfer cost to every alternative intermediate node in the destination alternative table. These additional transfer attempts are performed in priority order of the minimal transfer cost between the intermediate node and the destination node. This has the effect of moving the mail to the node closest to the destination if the destination itself cannot be reached.

If a destination cannot be reached, TCP will determine that the connection cannot be made within a period of time. For example, if the connection cannot be made for 20 seconds, each site has on average 2 bridgeheads, and the diameter of the network is up to 10, then a latency of 400 seconds, or 7 minutes would be required to attempt all of the alternative sites. This can be further optimized by keeping a cache of connections that were recently attempted and failed (e.g., failures in the last 30 minutes), and not attempting to connect to those sites.

If no connection can be made, in the Single Destination Case, the queue of messages is put aside and a later attempt to transmit the queue is performed in anticipation that the network will have been repaired at that later time.

The Multiple Destination Case

In some cases, mail is addressed to more than one recipient residing on different nodes. In this case, the network traffic optimal approach is to relay the mail across the links in the minimal spanning tree computed when the system started.

The mail recipients are grouped according to the last node where the path to the recipient's node first diverges. This node is the diverging node that has the highest priority on the destination alternative table (e.g., the minimal cost between the diverging node and the destination nodes). A fork of the message is created at the diverging node and the mail is placed on the queue for the diverging node for the recipients that take that path. The message must be forked the message when two recipients have paths that are only concurrent at the current node. It is advantageous to delay forking the message as much as possible, so given three recipients, the mail is transmitted to a closer "next hop" to avoid an additional fork.

The node can be efficiently computed using the spanning tree local partition table described in the initialization section. Using the partition table, the recipients of the mail are grouped according to the next hop in the minimal spanning tree to the destination for the recipient. A fork of the message is created for each of the groups of the message; and the mail is queued to the node that appears on the path within the minimal spanning tree from the current node to the target node, that is furthest from the current node (i.e., the node having the minimal cost to the destination node(s)).

Once the mail has been queued, transmission proceeds as described in the Single Destination Case above.

If a connection cannot be made to any of the diverging node alternatives for more than one target, a forking of the message is performed at the current node and the mail is queued for the new targets that appear as a result of the forking. In this way, if a node is not available the message is forked at the current node to allow the mail a greater chance of delivery. This does reduce efficiency where a node is not available, but can permit some or all of the mail to be successfully transmitted.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A computer-implemented method for transmitting a message over a computer network, said network having a current node, a target node, and one or more intermediate nodes connected to the network between the current node and the target node, the method comprising:
    creating a destination alternative table of the intermediate nodes located on the network having transmission costs to the target node that are less than the transmission costs of the current node to the target node, wherein the intermediate nodes are prioritized according to their minimum transmission costs;
    determining an available transmission schedule of the target node and the one or more intermediate nodes, wherein the available transmission schedule comprises an operating schedule indicating the times of day that the target node and each intermediate node in the created destination alternative table are available to accept transmissions from other network nodes;
    attempting transmission of the message to the target node as a function of the available transmission schedule of the target node;
    if the transmission of the message to the target node fails, attempting transmission of the message to at least one intermediate node having the highest priority as identified in the created destination alternative table, where the at least one intermediate node is available to accept transmissions at the time of attempting transmission of the message according to the determined available transmission schedule of the target node and the one or more intermediate nodes; and
    if the transmission of the message to the highest priority intermediate node fails, attempting transmission of the message to additional intermediate nodes of successively decreasing priority as identified in the created destination alternative table, said additional intermediate nodes being nodes which are available to accept transmissions at the time of attempting transmission of the message according to the determined available transmission schedule of the target node and the one or more intermediate nodes;
    wherein the message is transmitted over a computer network from the current node to at least two target nodes, the method further comprising:
    creating a minimum spanning tree for the network with the current node as a root;
    determining a last node of divergence from the minimum spanning tree of at least two recipients residing on different nodes;
    grouping recipients according to a last node of divergence; and
    transmitting the message to the last node of divergence.

2. The method of claim 1, further comprising,
    determining if the last node of divergence can transmit the message to the target node; and
    diverging the message from the current node for transmission to the target node when it is determined that the last node of divergence cannot transmit the message to the target node.

3. The method of claim 1, further comprising tracking the number of times the message has been transmitted between nodes;
    wherein the number of transmissions exceeds a minimum threshold, delaying additional transmissions of the message for a settling period; and
    wherein the number of transmissions exceeds a maximum threshold, returning the message as undeliverable.

4. The method of claim 1, wherein one or more computer-readable media have computer-executable instructions for performing the computer-executable method of claim 1.

5. A message communication system for transmitting a message, the message communication system having a current server, a target server, and one or more intermediate servers connected to a network between the current server and the target server on a message communication network, comprising:
    a destination alternative table of the intermediate servers located on the network having transmission costs to the target server that are less than the transmission costs of the current server to the target server, wherein the intermediate servers are prioritized according to their minimum transmission costs;
    the current server configured to execute computer-executable instructions stored on a computer-readable storage media for:
        determining an available transmission schedule of the target server and the one or more intermediate servers, wherein the available transmission schedule comprises an operating schedule indicating the times of day that the target server and each intermediate server in the destination alternative table accept transmissions from other network servers;
    attempting transmission of a message to the target server as a function of the available transmission schedule of the target server;
    if the transmission of the message to the target server fails, attempting transmission of the message to at least one intermediate server having the highest priority as identified in the destination alternative table, where the at least one intermediate server is available to accept transmissions at the time of attempting transmission of the message according to the determined available transmission schedule of the target server and the one or more intermediate servers;
    if the attempt to transmit the message to the highest priority intermediate server fails, attempting transmission of the message to additional intermediate servers of successively decreasing priority as identified in the destination alternative table, said additional intermediate servers being nodes which are available to accept transmissions at the time of attempting transmission of the message according to the determined available transmission schedule of the target server and the one or more intermediate servers; and tracking the number of transmissions between servers for the message, wherein the number of transmissions exceeds a minimum threshold, delaying additional transmissions for a settling period, and wherein the number of transmissions exceeds a maximum threshold, returning the message as undeliverable.

6. The system of claim 5, wherein the message is transmitted over a computer network from the current server to at least two target servers, said current server is further configured to execute computer-executable instructions for:

creating a minimum spanning tree for the network of servers with the current server as a root;

determining a last server of divergence from the minimum spanning tree of at least two recipients residing on different servers; a grouping recipients according to a last server of divergence; and transmitting the message to the last server of divergence.

7. The system of claim 6, further comprising, determining if the last server of divergence can transmit the message to the target server; and diverging the message from the current server for transmission to the target server when it is determined that the last server of divergence cannot transmit the message to the target server.

8. One or more computer-readable storage media having computer-executable instructions for transmitting a message over a computer network, said network having a current node, a target node, and one or more intermediate nodes connected to the network between the current node and the target node, comprising:

instructions for creating a destination alternative table of the intermediate nodes on the network and determining the transmission costs from the intermediate nodes to the target node that are less than the transmission costs of the current node to the target node, and prioritizing the intermediate nodes according to their associated minimum transmission costs;

instructions for maintaining a cache of intermediate nodes having failed connections occurring within a predetermined time period, wherein intermediate nodes are removed from the cache after the expiration of the predetermined time period;

instructions for determining an available transmission schedules of the target node and the one or more intermediate nodes, wherein the available transmission schedule comprises an operating schedule indicating the times of day that the target node and each intermediate in the node accepts transmissions;

instructions for attempting transmission of the message to the target node as a function of the cache of failed nodes and the available transmission schedule of the target node, wherein the available transmission schedule comprises an operating schedule indicating the times of day that the target node and each intermediate node in the created destination alternative table are available to accept transmissions from other network nodes, and if the transmission of the message to the target node fails, attempting transmission of the message to at least one additional intermediate node as a function of its priority as identified in the created destination alternative table, the cache of failed nodes, and the available transmission schedule of the at least one additional intermediate node, wherein the at least one additional intermediate node is available to accept transmissions at the time of attempting transmission of the message according to the determined available transmission schedule of the target node and the one or more intermediate nodes, and wherein the message is not transmitted to an intermediate node included in the cache of failed nodes;

instructions for attempting transmission of the message to the intermediate node having the highest priority as identified in the created destination alternative table if the attempt to transmit the message to the target node fails; and instructions for attempting transmission of the message to additional intermediate nodes of successively decreasing priority as identified in the created destination alternative table if the attempt to transmit the message to the highest priority intermediate node fails;

wherein the message is transmitted over a computer network from the current node to at least two target nodes, the computer-readable media further comprising:

instructions for creating a minimum spanning tree for the network with the current node as a root;

instructions for determining a last node of divergence from the minimum spanning tree of at least two recipients residing on different nodes;

instructions for grouping recipients according to a last node of divergence; and instructions for transmitting the message to the last node of divergence.

9. The computer-readable storage media of claim 8, further comprising:

instructions for determining if a last node of divergence can transmit the message to the target node and diverging the message from the current node for transmission to the target node when it is determined that the last node of divergence cannot transmit the message to the target node.

10. The computer-readable storage media of claim 8, further comprising:

instructions for tracking the number of transmissions between nodes for the message;

instructions for delaying additional transmissions for a settling period wherein the number of transmissions exceeds a minimum threshold; and instructions for returning the message as undeliverable wherein the number of transmissions exceeds a maximum threshold.

11. The method of claim 1 further comprising:

attempting transmission of the message to the target node when the transmission schedule of the target node indicates that the target node is available.

12. The system of claim 5 wherein the current server being configured to further execute computer-executable instructions being stored on a computer-readable storage media for:

attempting transmission of the message to the target server when the transmission schedule of the target server indicates that the target server is available.

13. The computer-readable storage media of claim 8, further comprising:

instructions for attempting transmission of the message to the target node when the transmission schedule of the target node indicates that the target node is available.

* * * * *